United States Patent Office 3,832,285
Patented Aug. 27, 1974

3,832,285
METHOD OF PRODUCING MALTOSE OF HIGH PURITY
Masashi Kurimoto, Okayama, Japan, assignor to Hayashibara Biochemical Laboratories Incorporated, Okayama, Japan
No Drawing. Filed May 24, 1972, Ser. No. 256,364
Claims priority, application Japan, May 31, 1971, 46/36,968
Int. Cl. C12b 1/00
U.S. Cl. 195—31 R    5 Claims

ABSTRACT OF THE DISCLOSURE

Very pure maltose is obtained from starch predominantly consisting of amylopectin by reaction with $\beta$-amylase free from significant amounts of $\alpha$-amylase, maltase, glucamylase, and isoamylase, dialysis of the reaction mixture through a membrane having an effective pore size of 5 A. to 30 A. against pure water before significant amounts of trisaccharides or oligosaccharides of lower molecular weight are formed, and recovering the maltose from the dialyzate.

---

This invention relates to the production of maltose, and particularly to a method of producing maltose of high purity from starch.

It is known to produce maltose by liquefying or solubilizing starch in the presence of enzymes or by means of acids to form a malt syrup which contains a mixture of dextrins and oligosaccharides and is then subjected to reaction with $\beta$-amylase. In addition to maltose, the known reaction product also contains glucose, maltotriose, maltotetraose, and $\alpha$- and $\beta$-limit dextrins. The dextrins may be removed by precipitation with alcohol, but the molecular weight of the other impurities is so close to that of maltose that they cannot readily be separated from the maltose. Commercial, reagent grade maltose actually contains 90% to 95% maltose and a purer product is not available.

It has also been proposed in Pat. No. 3,565,765 to subject starch to the action of $\alpha$-1,6-glucosidic-bond debranching enzymes such as isoamylase or pullulanase which convert the branched structure of amylopectin into the linear amylose chain which is then treated with $\beta$-amylase.

Both known methods permit maltose containing very little residual dextrin to be produced. However, the almost complete $\beta$-amylolysis of the prior art methods results in products which contain at least 3%–6% glucose and/or maltotriose if the starch employed as a starting material contains amylose and maltooligosaccharides having an odd number of glucose units. The cited methods cannot practically produce maltose purer than 95%, and the maltose cannot readily be separated from glucose and maltotriose by recrystallization because of the relatively small difference in molecular weight between the contaminants and maltose, and because of the platelet shape of the maltose crystals which tend to retain mother liquor.

Moreover, the maltoses produced by the known reaction methods may contain enough pyrogens originating in the original starches and the enzymes employed to make it inadvisable to employ such maltose for intravenous injection.

It has now been found that purer maltose than available heretofore in a practical manner can be prepared under conditions suitable for industrial application by subjecting a starch predominantly consisting of amylopectin to the action of pure $\beta$-amylase, and by dialyzing the reaction mixture against water.

The pure $\beta$-amylase required for the method of the invention is obtained by known methods from amylases rich in $\beta$-amylase recovered from vegetal matter such as wheat bran, wheat malt, soy beans, potatoes and the like. The $\beta$-amylase is purified by adsorption, salting out, solvent precipitation, or separation by means of Sephadex Gel, or the $\alpha$-amylase present may be inactivated by means of acid.

The starch employed as a starting material should predominantly consist of amylopectin, and substances forming mono- or trisaccharides under reaction conditions, such as maltooligosaccharides, maltodextrins, and amylose should be avoided as far as possible. The preferred starting materials thus are waxy corn starch, waxy rice starch, and amylopectin separated from other types of starches, but it will be shown that at least some of the advantages of this invention are available as long as amylopectin predominates in the starch used. The starch employed may thus come from potatoes, sweet potatoes, corn, or tapioca.

The starch is dispersed in water to a concentration of 2% to 30% (by weight), and liquefied or solubilized by heating of the slurry so produced to a temperature not substantially exceeding 130° C. The process is more easily controlled when the concentration does not exceed 20% and the temperature does not exceed 120° C. in order to attain a uniform dispersion and a D.E. (dextrose equivalent) of 5 or less. Acids and enzymes are to be avoided at this stage, but a slight alkalinity of the slurry can be helpful.

The solution so obtained is brought into contact with the $\beta$-amylase at the optimum reaction conditions for the latter, that is, a pH of 5.0 to 6.0, and a temperature of 50° C. to 60° C. If the starting material consists entirely or almost entirely of amylopectin, the $\beta$-amylolysis may be permitted to proceed until the reaction mixture has a D.E. (dextrose equivalent) of 50–60. If much amylose is initially present, the reaction should be interrupted at D.E. 30–40.

The time required to reach the desired reaction stage depends on the amount of $\beta$-amylase employed. When 5 to 100 units of enzyme are used per gram of starch, the reaction period may be between 15 and 5 hours. When the desired D.E. value is reached, the reaction may be interrupted by in inactivating the enzyme at high temperature.

The mixture is then dialyzed against water. The amount of water employed is not critical, but it is desirable to use the smallest amount of water consistent with the desired result in order to reduce the amount of liquid which later has to be evaporated. A compromise between the contradictory requirements which is usually practical involves the use of an outer solution in a volume five to ten times that of the aqueous reaction mixture. The period required for dialysis can vary greatly depending on the temperature and concentration of the liquid, and is usually between 5 and 15 hours. The dialysis temperature may vary between ambient temperature (approximately 20° C.) and about 50° C., and agitation or circulation of the outer liquid is beneficial in maintaining a desirable concentration gradient across the dialysis membrane.

Suitable membranes include tubes of regenerated cellulose (Visking), ultrafiltration membranes (Amicon Diaflo), and other materials employed for molecular sieving such as gel filtration or reverse osmosis. It is preferred to employ a membrane having an effective pore diameter of 5 A. to 30 A.

The dialyzate, which essentially is an aqueous maltose solution, is concentrated by partial evaporation of the water, and purified by treatment with active charcoal which removes coloring matter, and by ion exchange to remove ions. The solute thereafter is maltose having a purity greater than 95% and as high as 98%, if the starting material is essentially amylopectin, without any need for recrystallization. A purity greater than 99% is readily achieved by a single recrystallization step. If a common starch containing some amylose is employed as a starting material, very pure maltose can still be obtained if the reaction is interrupted before oligosaccharides of low molecular weight are produced.

The following Examples are further illustrative of this invention. Percentage values in the Examples are based on weight unless specifically stated otherwise.

EXAMPLE 1

Waxy corn starch which was practically pure amylopectin was suspended in enough water to produce 500 g. of a suspension containing starch in a concentration of 6.15%, and the starch was gelatinized by careful heating, whereupon the solution was adjusted to a pH between 5 and 6, and incubated at 50° to 60° C. with pure $\beta$-amylase free of $\alpha$-amylase, maltase, glucoamylase, and isoamylase. When the mixture reach a D.E. value (dextrose equivalent) of about 50, it was heated to terminate the reaction, and the solution of maltose and oligosaccharides was transferred to a seamless cellulose tube (Visking) which was immersed in a much greater volume of pure water which was stirred at room temperature for 15 hours.

The liquid outside the cellulose tube was analyzed and found to contain 16.10 g. solids (52.4% of the starting material) which consisted of 98.02% disaccharide, 1.87% trisaccharide, and 0.11% monosaccharide. No tetrasaccharide or higher saccharide (dextrin) could be detected.

When the same procedure was repeated with a starting suspension of 9.22 g. waxy starch (1.84%), 61.3% (5.65 g.) of the solids was found in the dialyzate and consisted of 98.25% disaccharide, 1.65% trisaccharide, and 0.10% monosaccharide.

Potato starch in an initial concentration 6.13% yielded 61.2% of the initial solids in the dialyzate which consisted of 93.64% disaccharide, 2.54% dextrin (tetrasaccharide or higher), 2.03% trisaccharide, and 1.78% monosaccharide. The yield was increased to 68.7% when the initial potato starch suspension had a concentration of only 1.80%, and consisted of 96.15% disaccharide, 1.31% each of dextrin and monosaccharide, and 1.23% trisaccharide.

The amounts of oligosaccharides and dextrins found in the dialyzate are due to the relatively large pore diameter (24 A.) of the cellulose employed.

EXAMPLE 2

Purified waxy corn starch was mixed with water to produce a 15% slurry. The suspended starch was gelatinized by heating the slurry to 130° C. for five minutes, whereby the starch solution showed a dextrose equivalent of less than 1. A solution of $\beta$-amylase extracted from wheat bran was treated with acid to inactivate the $\alpha$-amylase present and then salted out. The gelatinized starch solution was mixed with 50 units of salted-out $\beta$-amylase per gram of starch, and the mixture was held at pH 5.5 and 55° C. for ten hours. The rate of $\beta$-amylolysis then was about D.E. 65.

The reaction mixture was heated briefly to a temperature sufficient to inactivate the $\beta$-amylase, and packed in a tube of regenerated cellulose (Visking, 24 A. pore size). The tube was immersed for ten hours in an amount of pure water equal to ten times the volume of the liquid in the tube, while the aqueous liquid outside the tube was agitated continuously at ambient temperature of about 20° C.

The dialyzate was then partly evaporated in a vacuum, decolorized by treatment with active charcoal, deionized by passage over an ion exchange column, and further evaporated until a crystalline solid formed which was separated from the mother liquor and dried.

Its weight was 53% of the weight of the starch originally present in the slurry, and it consisted of 97.5% maltose.

When the cellulose membrane in the dialysis step was replaced by an ultrafiltration membrane (Amicon Diaflo membrane UM-05) under otherwise unchanged conditions, the yield was increased to 55%, but the purity reduced slightly to 96.8%. Even better results were obtained with slurries having an initial starch concentration of 5%. With a cellulose membrane, the yield was 55% and the purity 98.2%, while the ultrafiltration membrane produced a yield of 56% at apurity of 97.8%.

EXAMPLE 3

A 15% slurry of corn starch was gelatinized and mixed with $\beta$-amylase as in Example 2, and the reaction mixture was packed in a cellulose tube. The tube was immersed in a tank containing a tenfold volume of water which was continuously agitated and held at 55° C. for 7 hours. Thereafter, the tube was removed from the water tank and heated sufficienlty to inhibit enzyme activity in its contents, whereupon the tube was again cooled and returned to the water tank for further dialysis for five hours.

The external aqueous solution was worked up as in Example 2 and a solid product containing 97.6% maltose was recovered in a yield of 54%. When the initial starch slurry had a concentration of only 5%, a product consisting of 98.2% starch was recovered in a yield of 55%.

EXAMPLE 4

Purified potato starch was dispersed in water to form a 15% slurry which was held at 130° C. for 6 minutes to gelatinize the starch. The mixture was then adjusted to pH 5.5 and held at 55° C. in the presence of 30 units purified $\beta$-amylase per gram starch for four hours. It was dialyzed through a cellulose tube against ten volumes of pure water as described above, and the dialyzate was worked up in the same manner as described in Example 2.

The solid product recovered in a yield of 40% consisted of 96.0% maltose. When the enzyme action was stopped only after ten hours, the solid material obtained in an improved yield of 63% contained only 94.5% maltose.

Corresponding treatment of a 5% potato starch slurry produced a 39% yield of 98.1% maltose after four hours of reaction, and a 70% yield of 96.1% maltose after ten hours of reaction.

EXAMPLE 5

Purified potato starch was suspended in water to produce a 15% slurry which was adjusted to pH 10 and heated to solubilize the starch. The starch solution was adjusted to pH 5.5 and 55° C., mixed with $\beta$-amylase and incubated while enclosed in a cellulose tube immersed in a water tank as described in Example 3.

After four hours, the dialyzate was evaporated, purified, and further evaporated to produce a solid product in the manner of Example 2. It contained 96.7% maltose and weighed 35% of the initially dispersed potato starch. When reaction and dialysis were continued for eight hours, the yield rose to 68% while the purity was decreased to 94.6%.

Analogous treatment of a 5% potato starch suspension yielded 37% of a 98.3% maltose after four hours of reaction and dialysis, and 61% of a 96.1% maltose after eight hours.

EXAMPLE 6

An amylopectin obtained from potatoes and commercially available (Avebe A.G., Veendam, Holland) was dispersed in water to form a 5% slurry which was subjected to the action of $\beta$-amylase in the manner of Example 2, whereupon the reaction mixture was dialyzed through cellulose as described in Example 2.

A 98.0% maltose was obtained in the manner of Example 2 in a 54% yield.

When the method of the invention is applied to waxy corn starch and other starches essentially consisting of amylopectin only, maltose is formed by the β-amylase from the non-reducing end of the starch molecule, leaving β-limit dextrins of relatively high molecular weight which are readily separated from the maltose by dialysis. When the reaction mixture is more dilute, a higher proportion of the solutes passes through the membrane. Because the β-amylolysis is faster in the mixture containing less starch, the rate of maltose recovery and the purity of the recovered maltose are improved. When the reaction mixture is more concentrated, oligosaccharides are believed to be driven in part through the membrane by increased osmotic pressure.

As is evident from the preceding Examples, the following process variables should be controlled for obtaining the purest maltose:

The starting material should contain as little amylose as possible. The liquefaction of the starch should be carried out under conditions to hold the formation of linear oligosacchardies to a minimum, that is, at the lowest practical temperature and preferably in the absence of liquefying enzymes and acids. The β-amylase employed should be as pure as possible, and particularly be free of α-amylase, maltase, glucamylase, and isoamylase. The β-amylolysis should be interrupted before significant amounts of trisaccharides or lower oligosaccharides other than maltose are formed. This is particularly important when employing common starches containing substantial amounts of amylose. The pore diameter of the dialysis membrane should be approximately 10 A. if molecules larger than those of maltose are to be retained.

As will be evident from the Examples, useful results can be achieved under less stringent conditions, and a maltose of very high purity can be produced from starches containing significant amounts of amylose.

What is claimed is:

1. A method of producing maltose of high purity which comprises:
   (a) suspending starch predominantly consisting of amylopectin in an aqueous medium;
   (b) heating the suspension so formed to a temperature not substantially higher than 130° C. until said starch is solubilized;
   (c) adding pure β-amylase to the soluble starch solution so obtained and holding the mixture under reaction conditions to form maltose from the non-reducing terminal groups of the starch molecules by the action of said β-amylase;
   (d) terminating the action of said β-amylase on said starch before significant amounts of trisaccharides and saccharides of lower molecular weight than maltose are formed in said mixture;
   (e) dialyzing said mixture against water until maltose accumulates in said water; and
   (f) recovering maltose having a purity greater than 95% from the dialyzate.

2. A method as set forth in claim 1, wherein said mixture is dialyzed through a membrane having an effective pore diameter of 5 A. to 30 A.

3. A method as set forth in claim 2, wherein said pure β-amylase is free from significant amounts of α-amylase, maltase, glucamylase, and isoamylase.

4. A method as set forth in claim 3, wherein said mixture is dialyzed against said water while said solution is being held under said reaction conditions.

5. A method as set forth in claim 3, wherein said solution is dialyzed after said termination.

References Cited
UNITED STATES PATENTS

| | | | |
|---|---|---|---|
| 3,720,583 | 3/1973 | Fisher | 195—31 R |
| 2,891,869 | 6/1959 | Langlois | 195—31 R |

A. LOUIS MONACELL, Primary Examiner

T. G. WISEMAN, Assistant Examiner

U.S. Cl. X.R.

127—54; 195—7, 11